(12) United States Patent
Myrick (10) Patent No.: US 6,890,138 B1
(45) Date of Patent: May 10, 2005

(54) MODULAR PEGBOARD CARGO RESTRAINT

(76) Inventor: John M. Myrick, 44830 Seeley Dr., La Quinta, CA (US) 92253

( * ) Notice: Subject to any disclaimer, the term of this patent is extended or adjusted under 35 U.S.C. 154(b) by 38 days.

(21) Appl. No.: 10/782,698

(22) Filed: Feb. 18, 2004

(51) Int. Cl.$^7$ .......................... B61D 45/00; B65D 63/00
(52) U.S. Cl. ......................................... 410/94; 410/97
(58) Field of Search .............................. 410/46, 52, 94, 410/95, 121, 155, 156, 153, 117, 90, 91, 96, 410/97

(56) References Cited

U.S. PATENT DOCUMENTS

| | | | |
|---|---|---|---|
| 1,665,439 A | * | 4/1928 | Brown ........................ 410/153 |
| 2,621,807 A | * | 12/1952 | Rendich ...................... 269/54.5 |
| 3,508,764 A | * | 4/1970 | Bexon et al. .................. 410/90 |
| 3,767,253 A | * | 10/1973 | Kluetsch ....................... 410/118 |
| 4,027,892 A | * | 6/1977 | Parks ............................. 410/3 |
| 4,222,695 A | * | 9/1980 | Sarides ......................... 410/68 |
| 4,941,784 A | * | 7/1990 | Flament ....................... 410/121 |
| 5,788,310 A | * | 8/1998 | McKee ....................... 296/39.2 |
| 6,007,282 A | * | 12/1999 | Mundt .......................... 410/94 |
| 6,007,283 A | * | 12/1999 | Labeur ......................... 410/97 |
| 6,241,439 B1 | * | 6/2001 | Weber .......................... 410/94 |
| 6,503,036 B1 | * | 1/2003 | Bequette et al. .............. 410/94 |
| 6,575,679 B2 | * | 6/2003 | Bourgault et al. ............ 410/90 |
| 6,648,569 B2 | * | 11/2003 | Douglass et al. ............. 410/46 |
| 6,702,532 B1 | * | 3/2004 | Throener ...................... 410/94 |
| 6,712,567 B2 | * | 3/2004 | Hsu ............................. 410/46 |

* cited by examiner

*Primary Examiner*—D. Glenn Dayoan
*Assistant Examiner*—H. Gutman
(74) *Attorney, Agent, or Firm*—Donald R. Boys; Central Coast Patent Agency, Inc.

(57) ABSTRACT

A pegboard system for constraining items of cargo in transit has one or more pegboards to cover a cargo support area, the pegboards having an upper surface with openings for pegs, and a plurality of pegs sized to fit into the openings in the pegboards to constrain the items of cargo from substantial lateral movement. In some cases there are elastic top elements for pegs to protect items of cargo, and straps between pegs to aid in constraint of the items of cargo.

16 Claims, 11 Drawing Sheets

MODULAR PEGBOARD CARGO RESTRAINT

FIELD OF THE INVENTION

The present invention relates to the field of vehicle accessories and pertains more particularly to the methods for securing objects of cargo within moving vehicles, such as automobiles, trucks, aircraft and boats.

BACKGROUND OF THE INVENTION

It is well-known that vehicles of all sorts are used to transport a wide variety of cargo, such as bags, cans, bottles, boxes, packages and the like, and it is well known that there are many hazards in such transport. Vehicles used in general for transporting cargo of all sorts vary from very small utility vehicles to automobiles, pickup trucks and large tractor/trailer systems. Simple examples are used below to illustrate such hazards, but it will be understood that the same sorts of hazards exist in many other situations.

As an example of the hazards of moving cargo with vehicles, many people use their automobiles to transport purchased items, such as groceries and packages, after they do their shopping. One of the problems is the transport of items from the store to home afterwards. When a consumer purchases products from a store and places them in the trunk of his or her automobile, the purchased items are typically not constrained, and are left to the mercy of many disruptive forces on the journey home. The purchased items may roll as the automobile turns, fly in the air as the automobile passes over a speed bump, or be crushed by surrounding objects in the trunk.

Currently, the trunks of most automobiles are relatively flat, and offer no means of securing vulnerable items such as grocery bags, vases, glass containers, eggs in cartons, and so on. What is clearly needed is a reliable system to secure packages and other items in the trunks of automobiles, and by extension on any platform of a moving vehicle that may be used to transport cargo. Such a system would greatly aid in the safe and economical transport of vulnerable items.

SUMMARY OF THE INVENTION

In a preferred embodiment of the present invention a pegboard system for constraining items of cargo in transit is provided, comprising one or more pegboards to cover a cargo support area, the pegboards having an upper surface with openings for pegs, and a plurality of pegs sized to fit into the openings in the pegboards to constrain the items of cargo from substantial lateral movement.

Some individual pegboards have lateral interfaces for joining a plurality of pegboards to cover the cargo support area. In some cases the lateral interfaces are dovetail shapes, and in some other cases the lateral interfaces include one or more of magnets, spring clamps, pin-and-socket interfaces, or adhesive fasteners.

In some embodiments the openings are round holes extending at least part way through a thickness of the pegboard, and the pegs are round shafts having a diameter to firmly engage the openings. Also in some embodiments there are elastic top elements engaging one or more of the pegs, the top elements having a greater lateral extent than the pegs, and thereby providing protection between pegs and items of cargo. In some cases the pegs are hollow tubes and the top elements comprise an extension portion for engaging the inside of the tube.

In some embodiments of the invention there are straps for engaging pegs to further constrain the items of cargo, the straps having ends enabled to attach to individual pegs. In a preferred embodiment the ends of the straps are enabled by sleeves to slidably engage pegs. In some cases the sleeves have a height less than one half the height of pegs, such that sleeves from two different straps may engage the same peg.

In another aspect of the present invention a method for constraining cargo in transit is provided, comprising the steps of (a) covering at least a portion of a cargo area with one or more pegboards each having an upper surface with openings for pegs; (b) placing an item of cargo on the pegboard; and (c) placing pegs in openings in the one or more pegboards in a pattern around the item of cargo to constrain the item from lateral movement.

In a preferred embodiment of the method, individual pegboards have lateral interfaces for joining to cover the cargo support area, and including a step for engaging the pegboards by the lateral interfaces. In some cases the lateral interfaces are dovetail shapes. In other cases the lateral interfaces include one or more of magnets, spring clamps, pin-and-socket interfaces, or adhesive fasteners.

In some embodiments of the method, the openings are round holes extending at least part way through a thickness of the pegboard, and the pegs are round shafts having a diameter to firmly engage the openings. In some embodiments there is a further step for engaging one or more elastic top elements to one or more of the pegs, the top elements having a greater lateral extent than the pegs, and thereby providing protection between the pegs and the item of cargo.

In some cases the pegs are hollow tubes and the top elements comprise an extension portion for engaging the inside of the tube. There may further be a step for engaging straps between pegs to further constrain the item of cargo, the straps having ends enabled to attach to individual pegs. In a preferred embodiment the ends of the straps are enabled by sleeves to slidably engage pegs. Also in some cases the sleeves have a height less than one half the height of the pegs, such that sleeves from two different straps may engage the same peg.

BRIEF DESCRIPTION OF THE DRAWING FIGURES

FIG. 7b is a plan view of the system of FIG. 7a.

DESCRIPTION OF THE PREFERRED EMBODIMENTS

According to a preferred embodiment of the present invention, modular pegboards which have openings for insertion of pegs are used in conjunction with pegs for securing cargo in transport, and in some cases flexible straps are used with the pegs. The methods and apparatus of the invention are described in enabling detail below by exemplary embodiments of the invention.

Figure 1A:
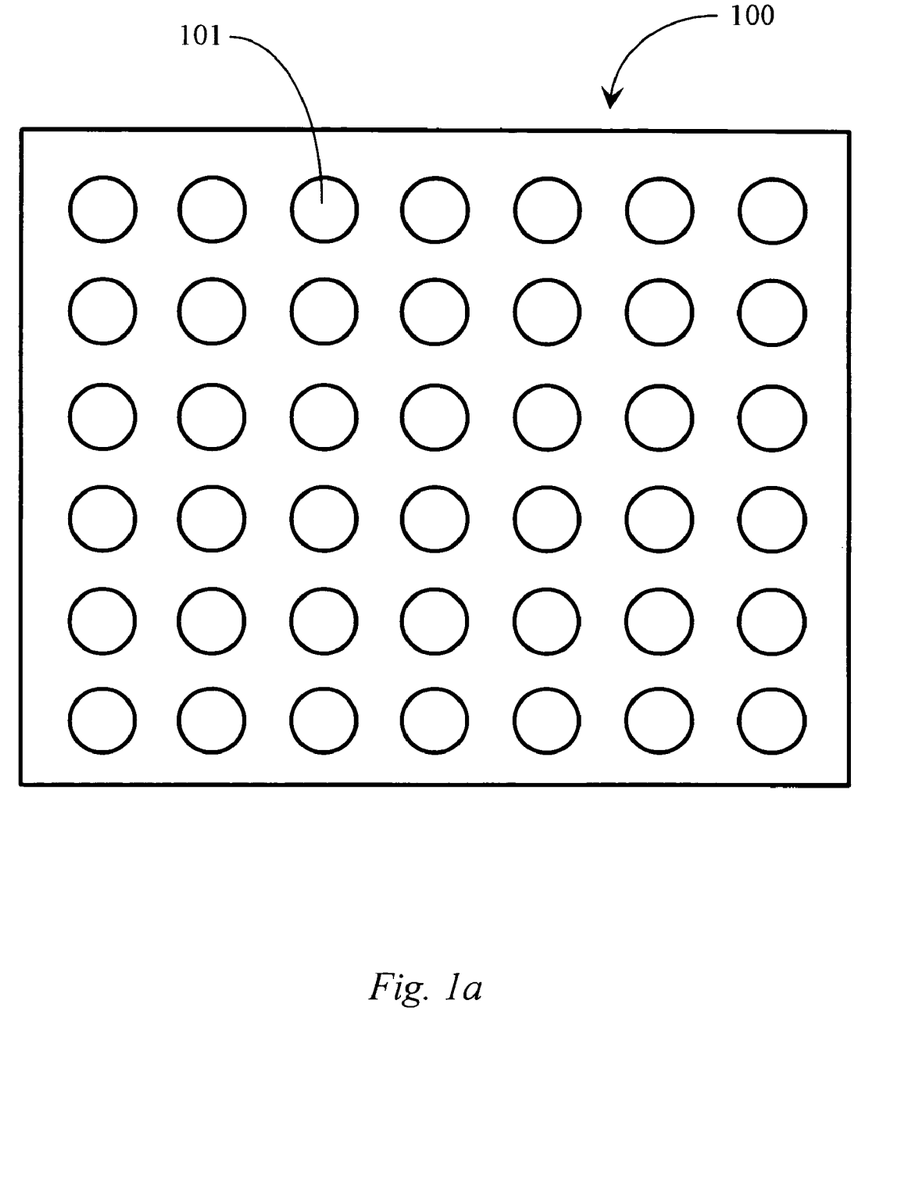
FIG. 1a is a plan view of a pegboard according to an embodiment of the present invention.

FIG. 1a is an overhead view of a pegboard 100 according to a preferred embodiment of the present invention. Pegboard 100 has a pattern of openings 101, which are round holes in a preferred embodiment, and in the embodiment shown the openings 101 are arranged in rows and columns. Further, the openings 101 may or may not pass completely through the pegboard. Also in the embodiment shown the openings are equally spaced, although this is not a general limitation in the invention, nor is the number of holes a limitation.

Pegboard 100 is substantially rectangular in this exemplary embodiment, although this shape also should not be taken as a limitation, but as a convenience. The length and width of one modular board may vary widely in different embodiments, but is generally determined by use. It is desirable, for example, that a number of boards 100 be fitted together to provide coverage of a surface, such as the floor of the trunk of an automobile, or the floor of the bed of another conveyance, such as a pickup truck. A relatively small size compared to the surface to be covered allows the modular boards 100 to be conveniently stacked and stored when not in use, and to be efficiently packaged for shipment and displayed for sale.

Figure 1B:
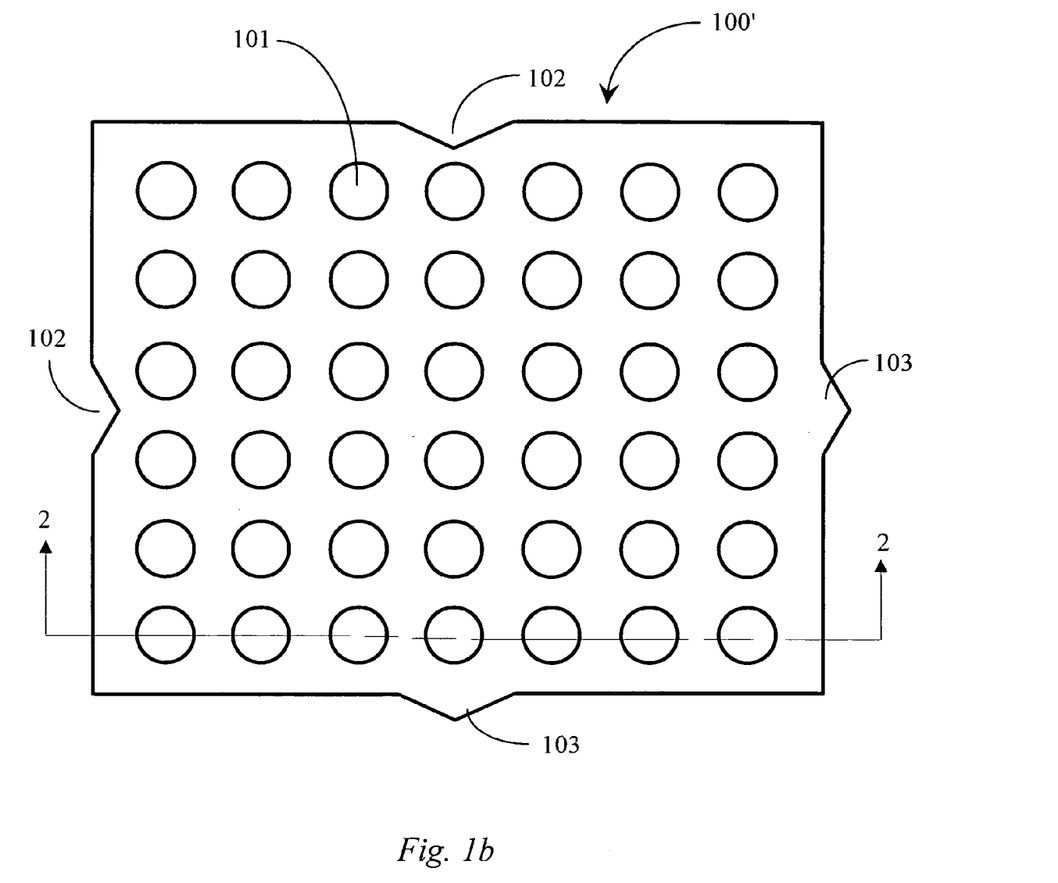
FIG. 1b is a plan view of a pegboard having engagement features in the sides.

FIG. 1b illustrates a pegboard 100' similar to pegboard 100 of FIG. 1, with engagement features 102 and 103 molded into sides of board 100' such that the boards 100 may dovetail and slidably fit together, as an aid in constraining the boards 100 in use. It will be apparent to the skilled artisan that the triangular shape shown in FIG. 1b may differ in other embodiments, and many different sorts of engagement features may be used to accomplish this purpose. The composition of pegboard 100 in this embodiment is molded plastic, although again this is a convenience rather than a limitation.

Figure 2:
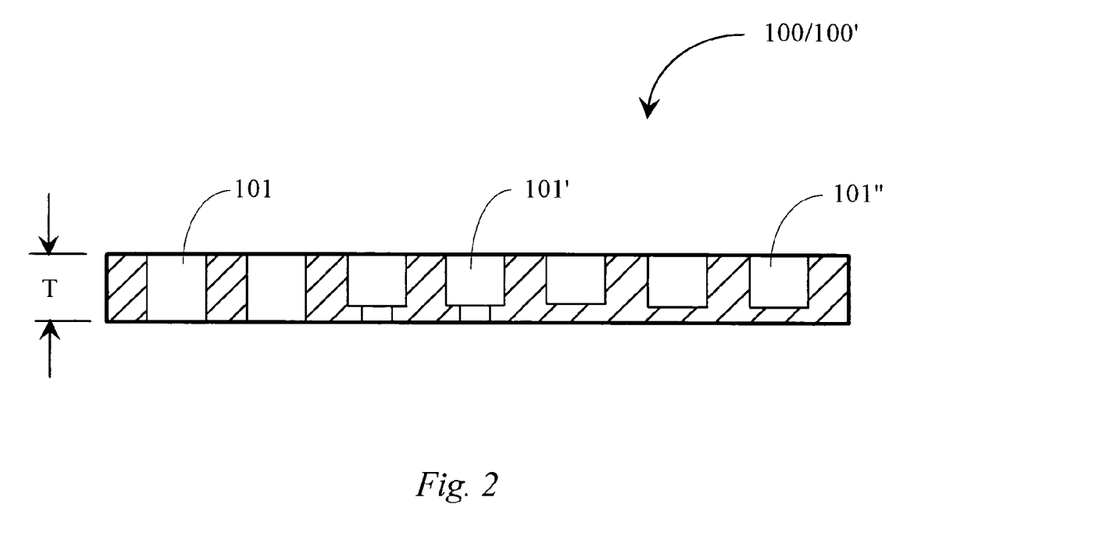
FIG. 2 is a side elevation view in cross-section of the pegboard of FIG. 1b.

FIG. 2 is a side elevation view cross-section view of pegboard 100 or 100', taken generally along section line 2—2 of FIG. 1b. In the present embodiment, the thickness T of board 100 or 100' may range from ½" thickness to 2", but in other embodiments the thickness may be smaller or greater. Openings 101, 101' and 101" are for support of pegs 300 not shown in FIG. 2, but described further below, and there is a requirement for supporting the pegs 300 in the openings 101, which is at least in part a function of the depth of the openings 101, which in turn may depend, at least in part, on the thickness of the pegboard 100. Three different styles have been shown for openings, identified in FIG. 2 as 101 (straight-though hole), 101' (hole with a shelf part way through) and 101" (blind hole not extending through the board. It will be apparent to the skilled artisan that these and other shapes and styles of openings may be used.

As mentioned briefly above, it is not specifically required that pegboard 100 have circular holes 101 for openings to support pegs. The openings 101 may take a variety of shapes in alternative embodiments, such as rectangles, triangles, and so on, and openings of different shapes, sizes and depths may be used in the same board 100.

In alternative embodiments, pegboard 100 may be made of any one of various materials such as urethane, metal, aluminum, wood, rubber, various polymers, and so on. The material will depend in many instances at least in part on intended use and desired attributes. For example, if such a pegboard 100 is to be used in a watercraft, composition would preferably be of a water-resistant material.

In still other embodiments, the sides of the board 100 need not be cut irregularly as described above. Boards 100 may be connected in a matrix to cover a desired area by other means such as magnets, perforated sides mating with pinned sides in a pin-and socket arrangement, sides with hook and pile fastener systems such as VELCRO™, spring clamps, and a variety of other ways. Again, the mode of connection will vary at least in part depending upon the given use and required functionality of the pegboard 100 and the vehicle.

Figure 3:
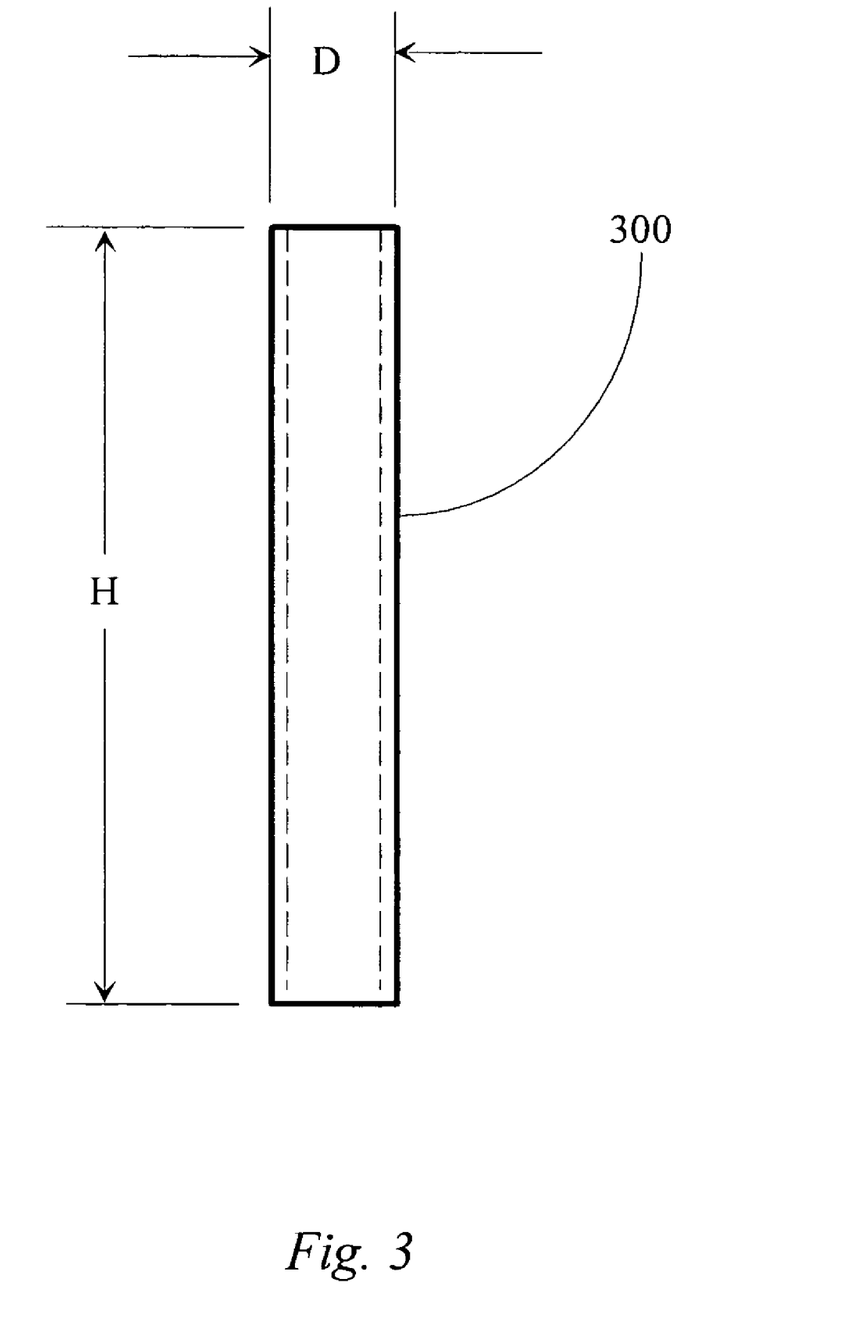
FIG. 3 is an elevation view of a peg in an embodiment of the invention.

FIG. 3 is an elevation view of a peg 300 which, in a preferred embodiment, is used for insertion into openings 101 in pegboard 100 to support cargo in transit. In a preferred embodiment, peg 300 is cylindrical, with a diameter D and height H, and may be, for example, a cut piece of plastic pipe. The shape and diameter of pegs in embodiments of the invention must match openings in pegboards 100, such that pegs 300 may be inserted in any desired pattern in openings 101 to partially surround, and thereby constrain an object placed for transport, the object resting on the pegboard 100. For example, a user might have a system of pegboards 100 fit together to cover the trunk area of an automobile. In the event of a need to transport a can of gasoline, to refuel an automobile that is out of gas, for example, the user might place the gas can on the pegboard 100 in the trunk, and then place pegs 300 into the pegboard 100 in a pattern to constrain the gas can laterally, so it can not tip over in transit.

The height H of an individual peg 300 will be, in many cases commensurate with the particular item it is used to constrain. Therefore, pegs 300 of several different lengths may be made available in a system of pegboards 100 and pegs 300 to allow a user a choice in the peg 300 lengths best suited to a task. The cross section of an individual peg 300, as stated briefly above, must match the cross section of the openings 101 in pegboard 100 in pegboard 100.

It is not specifically required that pegs 300 be made of any particular material. In one embodiment pegs 300 are cut pieces of plastic pipe, but pegs 300 may be composed of a variety of other materials such as steel, plastic, polymers, rubber, etc., and may be solid rather than hollow. The composition of the pegs 300 will depend, at least to some degree, on the particular use and requisite requirements of the system of pegs and pegboards. For instance, if the apparatus is to be used for transport of gasoline, a material resistant to corrosive effects of gasoline might be used. If, on the other hand, the system is to be used on watercraft, a waterproof composition may be used. And if the apparatus must be lightweight, a lightweight composition must be used.

Figure 4A:
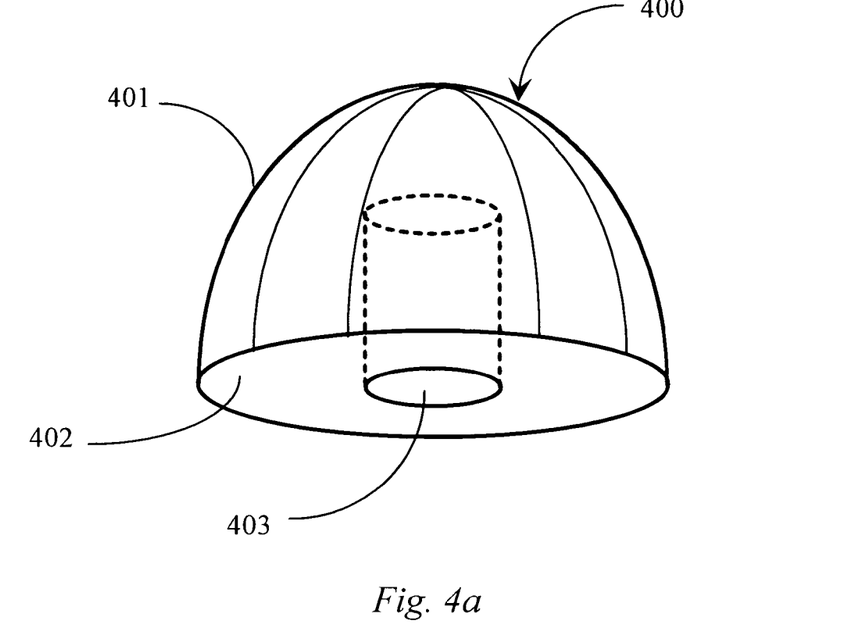
FIG. 4a is an elevation view of an elastic element for use with the pegs of FIG. 3.

FIG. 4a is an elevation view of an elastic cap element 400 meant to be fitted onto the upper extremity of pegs 300 in some embodiments, to act as a cushion between the pegs 300 and the cargo. The elastic element 400 in the embodiment shown in FIG. 4a has a dome shape 401 and an opening 403 in an otherwise flat bottom area 402, the opening corresponding to the diameter, or other shape, of the corresponding peg 300 to which it may be assembled. The outside size of the elastic element 400 is dictated by several factors. The size may vary as to the diameter of the peg 300. It may vary as to the length of the peg 300. It may vary as to its purpose and function. It may also vary according to the particular item is encloses. The height and diameter of elastic element 400 may also vary considerably in different embodiments. A variety of materials may be used for the elastic element 400, such as urethane and other long-chain polymers, sponge material, rubber, both natural and synthetic, and other materials as well. The composition of the elastic element 400 is dependent on a number of factors dictated by its function and purpose and the particular item of cargo it may be used to constrain.

Figure 4B:
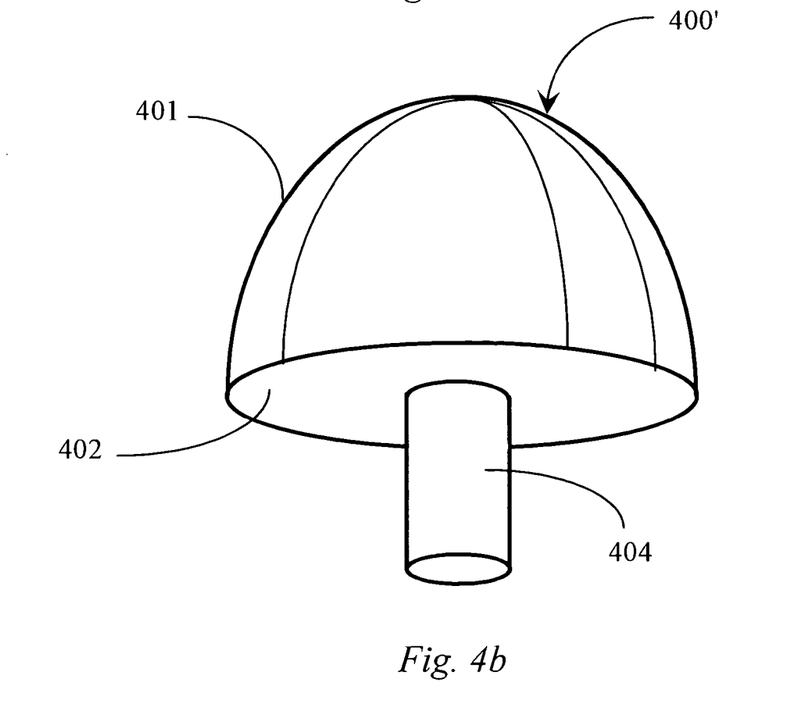
FIG. 4b is an elevation view of an alternative elastic element for use with the pegs of FIG. 3.

In still another embodiment illustrated in FIG. 4b elastic element 400' may have a protruding element (shaft) 404 on the bottom surface 402 for means of fitting into the inside diameter a peg 300 or into a corresponding recess on the top of peg 300. This embodiment consequently would not have a recess on the bottom surface. In another embodiment elastic elements 400 may be made in pairs joined by a relatively thin extrusion, a cord, or a cable, so that elements 400 fitted to adjacent pegs 300 will also provide a joining element between pegs 300 to aid in constraining items of cargo.

In other embodiments the top surfaces of elastic elements 400 may take other shapes. The top surface may be conical, it may be flat, or it may even be of an ornamental figurine shape.

Figure 5:
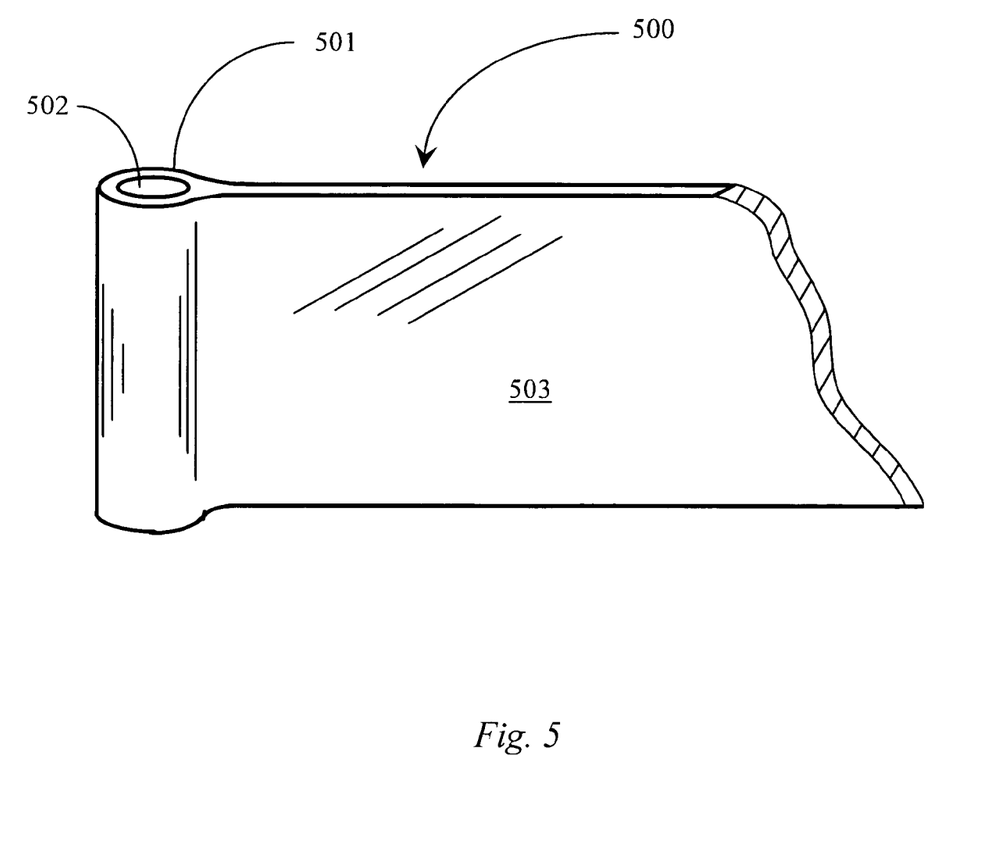
FIG. 5 is an elevation view of a rubber strap useful with pegs and pegboards in embodiments of the invention.

FIG. 5 is an elevation perspective view of an elastic strap 500 useful in embodiments of the present invention. Each end of strap 500 (one end is shown) has a sleeve 501 with an opening 502 sized to fit over a peg 300, such that strap 500 may be disposed between any two pegs 300 in a system for constraining cargo, with web area 503 extending between the pegs. The inside diameter of sleeves 501 corresponds generally to the diameter of the pegs 300 to which they may be slidably engaged. The lengths of straps 500 between end sleeves 501 may vary considerably. Varying lengths provide a user with an ability to accommodate items of various sizes to be constrained. The height of sleeves 501 is limited only by the length of corresponding pegs 300, but in most cases will be considerably less than the height of a peg 300, so that the ends of two straps 500 may engage the same peg 300, one strap 500 to extend from the peg 300 in one direction toward an adjacent peg 300, and the other strap 500 to extend in another, substantially opposite direction toward a different adjacent peg 300. In this way elastic straps 500 may be used to completely surround items of cargo to be constrained. Height of web area 503 may vary as well, and may in some instances be less than the height of sleeves 501 on the ends of the straps 500. The thickness of web area 503 will also depend to some extent on the items to be constrained and particular intended use.

Straps 500 are preferably elastic, as described above, but the particular elastic material may vary. The straps 500 may be made of rubber, either natural or synthetic, but it is not specifically required that the strap be rubber. The strap 500 may be of a flexible cloth or textile with Velcro™ ends, for example. Each Velcro™ end would wrap around and enclose a peg 300. In another embodiment, bungee cords may be used instead of the straps 500. In this embodiment, the strap function is substantially provided by elastic bungee material with the distal ends fastened to metal hooks. The hooks have dimensions chosen to correspond to pegs 300 to which they may attach.

Figure 6A:
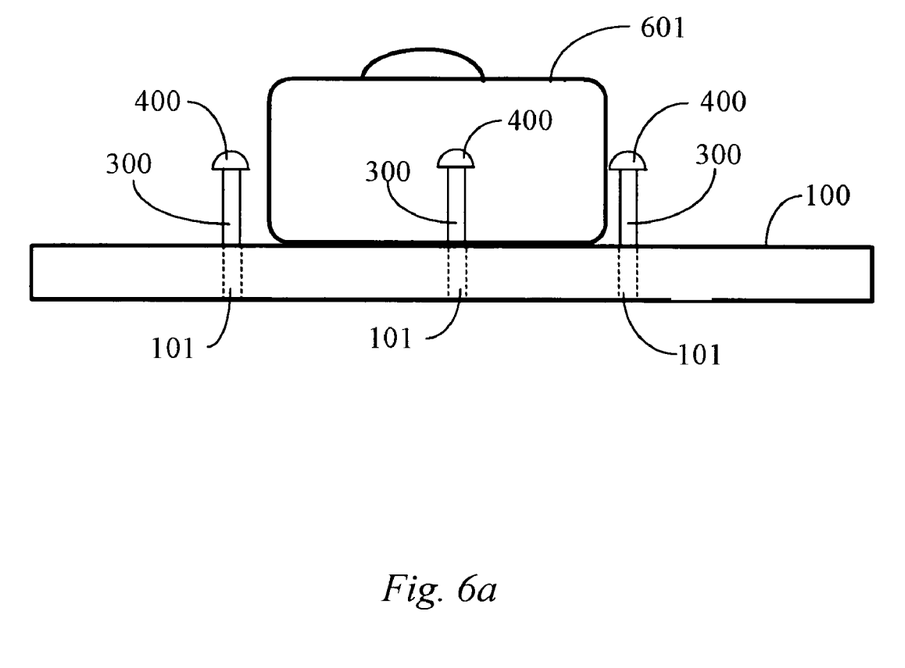
FIG. 6a is an elevation view of a pegboard system with pegs and elastic elements according to an embodiment of the present invention.

FIG. 6a is an elevation view of a system comprising pegs 300 inserted into openings 101 in a pegboard 100 according to an embodiment of the present invention, the pegs 300 having elastic elements 400 fitted to the upper ends of the pegs 300. An item of cargo 601 is shown placed upon pegboard 100, and pegs 300 are arranged around item 601. It may be seen that the item of cargo, if displaced toward a peg 300, will first contact elastic elements 400 rather than the peg 300.

Figure 6B:
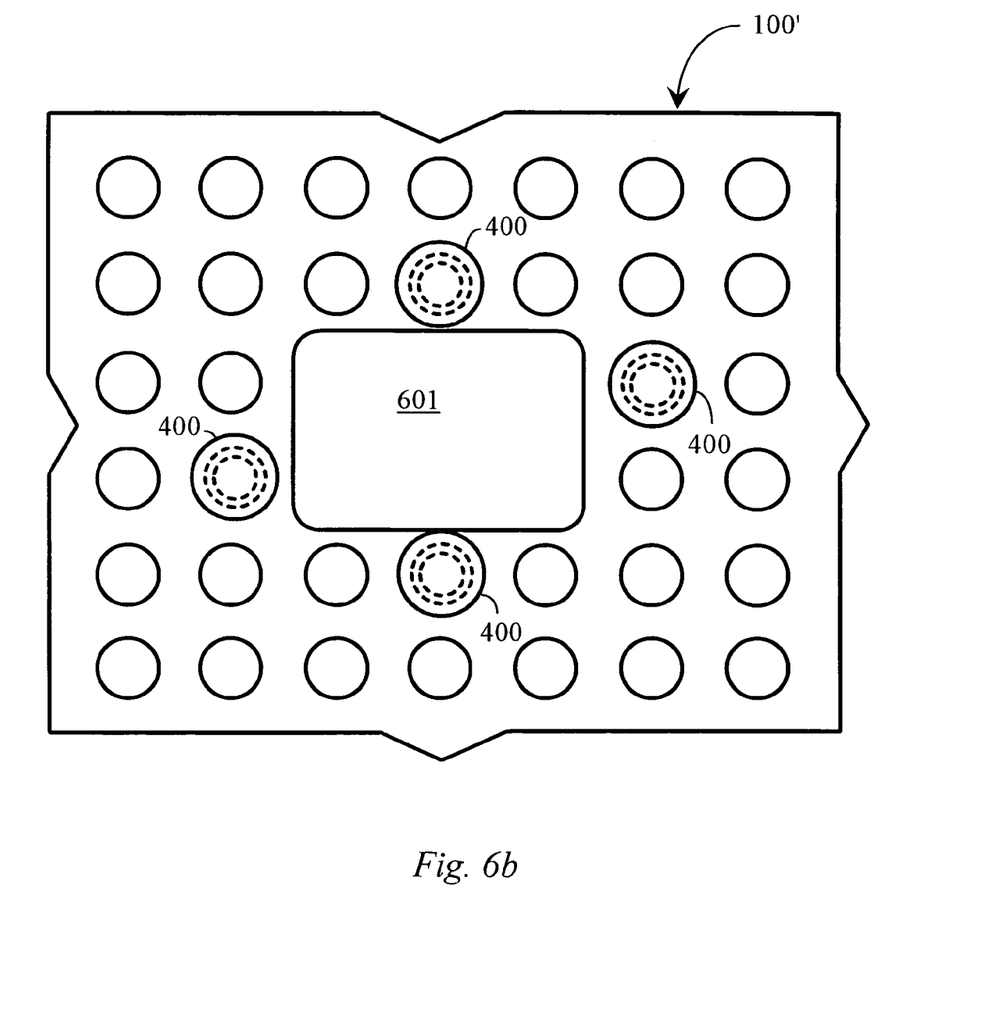
FIG. 6b is a plan view of a pegboard system according to an embodiment of the invention, including elastic elements of FIG. 4.

FIG. 6b is a plan view of the system of FIG. 6a showing item 601 resting on pegboard 100 and constrained by four pegs 300, three of which may be seen in FIG. 6a, with each peg having an elastic element 400 affixed thereto. Again, it is clear that item 601, if displaced in any direction, will contact one or more of the elastic elements 400 rather than any other portion of the system. It is also apparent in the plan view of FIG. 6b, that the hole pattern will not always allow pegs to be inserted such that elements 400 will be equidistant from an item of cargo to be constrained, but this should not be a problem if there are a sufficient number of openings 101 in a relatively even matrix.

Figure 7A:
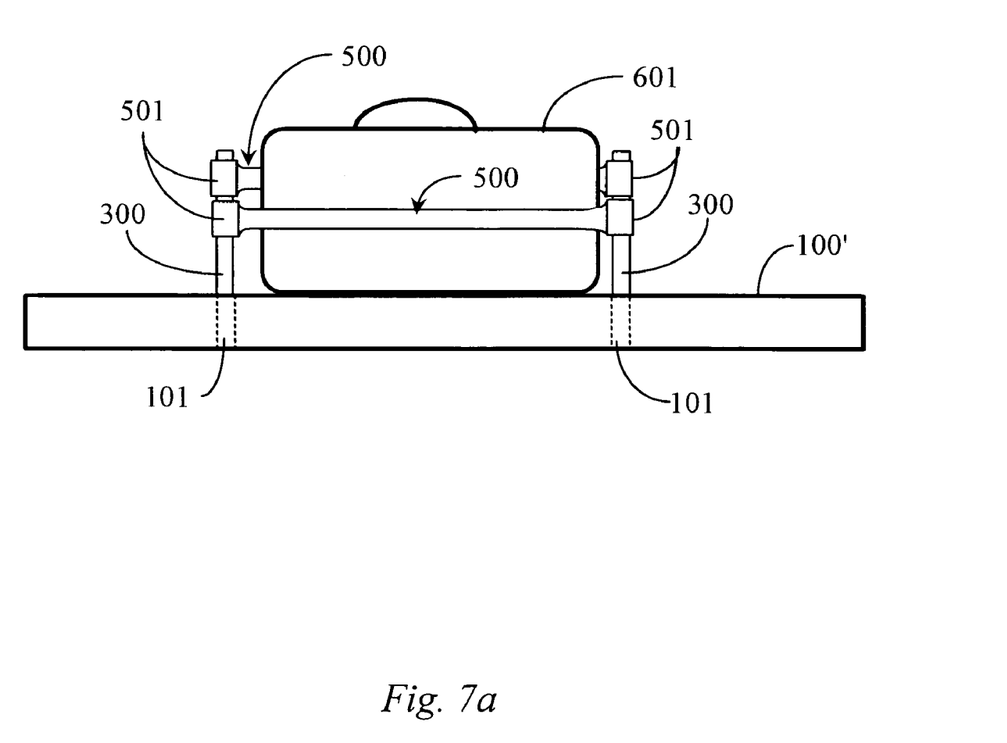
FIG. 7a is an elevation view of a pegboard system restraining an item of cargo according to an embodiment of the invention

FIG. 7a is an elevation view of a system with a pegboard 100', two pegs 300, and two elastic straps 500 constraining an item of cargo 601. In this embodiment sleeves 501 are of a length (height) considerably less than the overall height of pegs 300 so each peg 300 may connect to both elastic straps 500 to enclose the item of cargo.

Figure 7B:
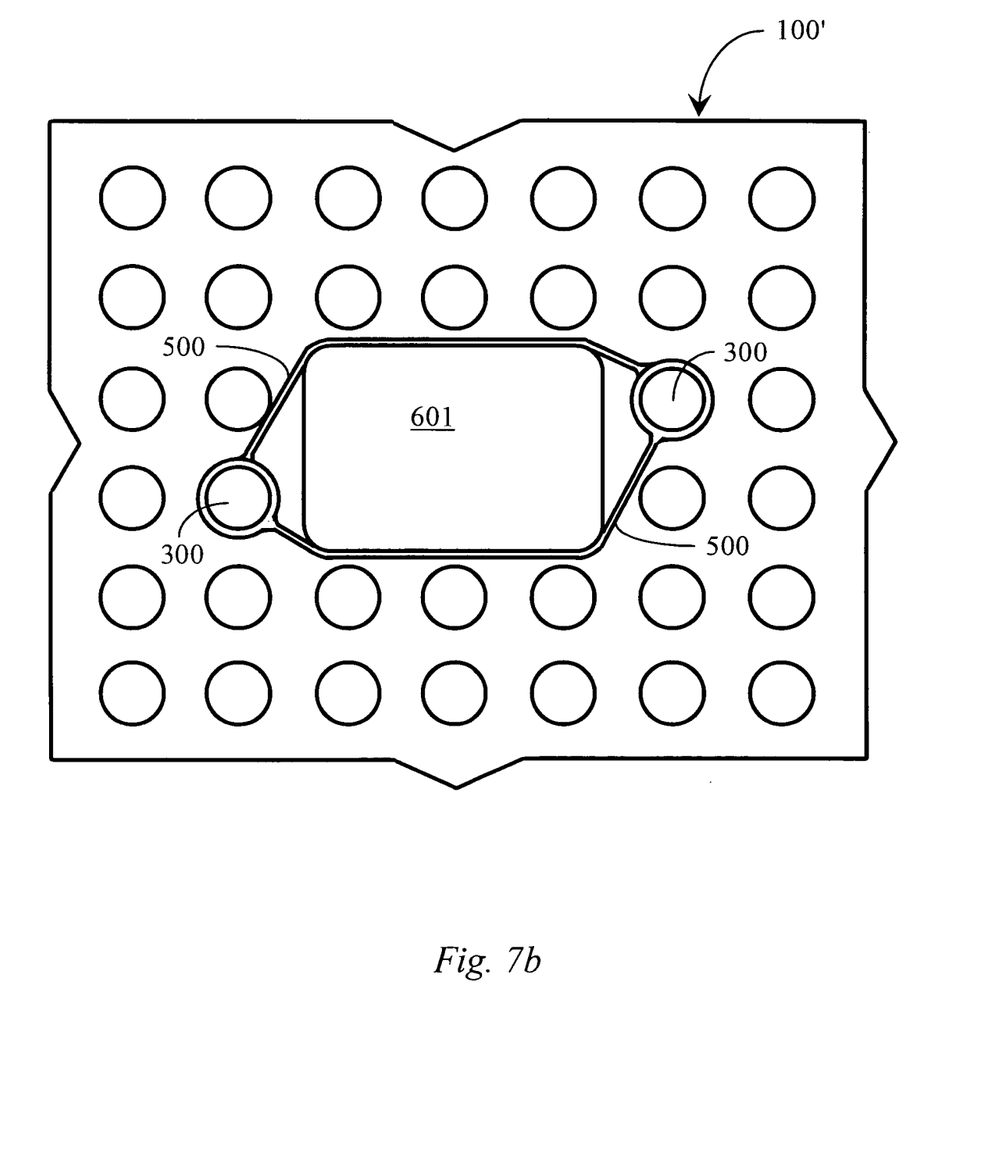

FIG. 7b is an elevation view of the system of FIG. 7a with pegboard 100', pegs 300, elastic straps 500, and item of cargo 601 of FIG. 7a constrained by the straps 500. In this case there are two pegs 300 and two straps 500, but it will be apparent to the skilled artisan that the number of pegs 300 and straps 500 may vary. In this illustration elastic elements 400 are not shown to better illustrate the use of straps 500, but elements 400 may well be used in other embodiments.

Figure 8:
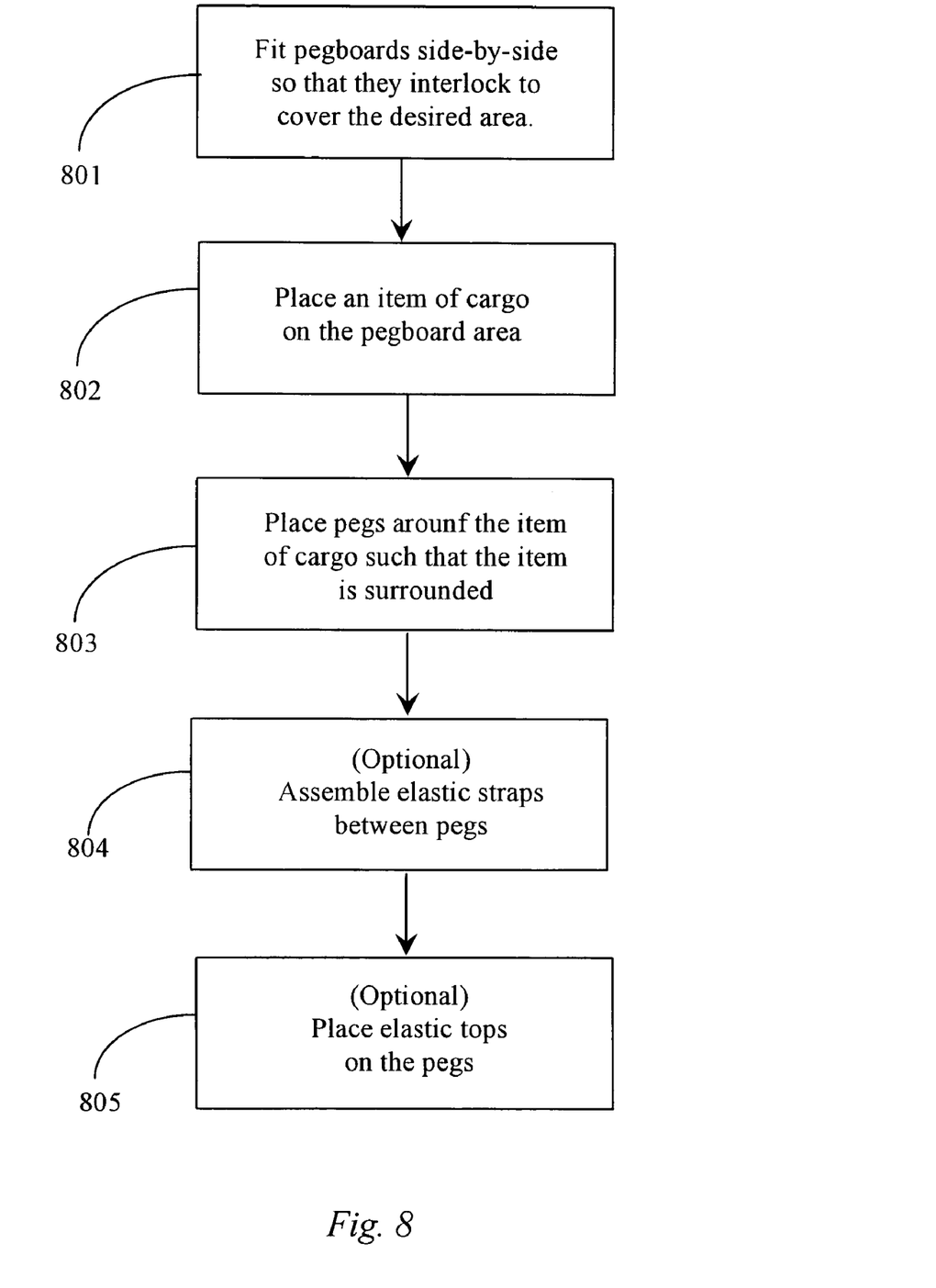
FIG. 8 is a flow diagram illustrating an exemplary method for assembly and use of pegboard, pegs, and rubber straps in an embodiment of the present invention.

FIG. 8 is a flow diagram illustrating an exemplary method for assembly and use of pegboards, pegs, straps and peg tops in an embodiment of the present invention. In step 801 modular pegboards are fitted together to cover a desired area, such as the trunk space of an automobile. In step 802 one or more items of cargo are placed on the pegboard area. In step 803 pegs are inserted into the peg board in a pattern to constrain the one or more items of cargo. In step 804, which is an optional step, straps are fitted to mounted pegs to further constrain items of cargo. In step 805, also optional, elastic tops are fitted to one or more of the pegs to further constrain and protect items of cargo.

It will be apparent to the skilled artisan that embodiments of the invention described above may be altered in many ways without departing from the spirit and scope of the present invention, and many of the ways have already been detailed. Other features not mentioned in this specification, but known to one skilled in the art may also be integrated as well, without departing from the spirit and scope of the present invention. There are, for example, a wide variety of materials that may be used, there are many changes that may be made in dimensions and so forth to accommodate different needs, and there may be decorative effects (colors, shapes) that may be used, all within the scope of the invention. The methods and apparatus of the present invention should therefore be afforded the broadest possible scope under examination. The spirit and scope of the present invention should be limited only by the claims that follow.

What is claimed is:

1. A pegboard system for constraining items of cargo in transit, comprising:

one or more pegboards to cover a cargo support area, the pegboards having an upper surface with openings for pegs; and a plurality of pegs sized to fit into the openings in the pegboards to constrain the items of cargo from substantial lateral movement;

elastic top elements engaging one or more of the pegs wherein the top elements have a greater lateral extent than the pegs, thereby providing protection between the pegs and the items of cargo.

2. The system of claim 1 wherein the pegboards each have lateral interfaces for joining to cover the cargo support area.

3. The system of claim 2 wherein the lateral interfaces are dovetail shapes.

4. The system of claim 1 wherein the openings are round holes extending at least part way through a thickness of the pegboard, and the pegs are round shafts having a diameter to firmly engage the openings.

5. The system of claim 1 wherein the pegs are hollow tubes and the top elements comprise an extension portion for engaging the inside of the tube.

6. The system of claim 1 further comprising straps for engaging the pegs to further constrain the items of cargo, each strap having an end enabled to attach to one of the pegs.

7. The system of claim 6 wherein the ends of the straps are enabled by sleeves to slidably engage the pegs.

8. The system of claim 7 wherein the sleeves have a height less than one half the height of the pegs, such that the sleeves from two of the straps may engage one of the pegs simultaneously.

9. A method for constraining cargo in transit, comprising the steps of:

(a) covering at least a portion of a cargo area with one or more pegboards each having an upper surface with openings for pegs;

(b) placing an item of cargo on the pegboard;

(c) placing pegs in openings in the one or more pegboards in a pattern around the item of cargo to constrain the item from lateral movement; and (d) engaging one or more elastic top elements to one or more of the pegs, the top elements having a greater lateral extent than the pegs, thereby providing protection between the pegs and the item of cargo.

10. The method of claim 9 wherein the pegboards have lateral interfaces for joining to cover the cargo area, and including a step for engaging the pegboards by the lateral interfaces.

11. The method of claim 10 wherein the lateral interfaces are dovetail shapes.

12. The method of claim 9 wherein the openings are round holes extending at least part way through a thickness of the pegboard, and the pegs are round shafts having a diameter to firmly engage the openings.

13. The method of claim 9 wherein the pegs are hollow tubes and the top elements comprise an extension portion for engaging the inside of the tube.

14. The method of claim 9 further comprising a step for engaging straps the between the pegs to farther constrain the item of cargo, each strap having an end enabled to attach to one of the pegs.

15. The method of claim 14 wherein the ends of the straps are enabled by sleeves to slidably engage the pegs.

16. The method of claim 15 wherein the sleeves have a height less than one half the height of the pegs, such that the sleeves from two of the straps may engage one of the pegs simultaneously.

* * * * *